United States Patent [19]

Petrò

[11] Patent Number: 6,153,554
[45] Date of Patent: Nov. 28, 2000

[54] PROCESS FOR THE PREPARATION OF SUPPORTED, NON-PYROPHORIC, SKELETON CATALYSTS OF POLAR SURFACE

[76] Inventor: Jòzsef Petrò, Dés u. 28., Budapest, Hungary

[21] Appl. No.: 09/284,415

[22] PCT Filed: Oct. 14, 1997

[86] PCT No.: PCT/HU97/00062

§ 371 Date: Apr. 14, 1999

§ 102(e) Date: Apr. 14, 1999

[87] PCT Pub. No.: WO98/16309

PCT Pub. Date: Apr. 23, 1998

[30] Foreign Application Priority Data

Oct. 15, 1996 [HU] Hungary ................................. 9602856

[51] Int. Cl.$^7$ ............................. B01J 25/00; B01J 25/02; B01J 25/04; B01J 23/00; B01J 23/70
[52] U.S. Cl. ........................ 502/301; 502/325; 502/337; 502/338; 502/339; 502/345
[58] Field of Search .................................. 502/301, 325, 502/337, 338, 339, 345

[56] References Cited

U.S. PATENT DOCUMENTS

Re. 32,104  4/1986  Gray ........................................ 502/301
3,809,658  5/1974  Csuros et al. .
4,375,003  2/1983  Allain et al. .

FOREIGN PATENT DOCUMENTS 611987   11/1948  United Kingdom .
621749    4/1949  United Kingdom .
1302563   1/1973  United Kingdom .

Primary Examiner—Tom Dunn
Assistant Examiner—Cam N. Nguyen
Attorney, Agent, or Firm—Keil & Weinkauf

[57] ABSTRACT

According to the invented process an alloy powder of catalytically active metal(s) and alkali-soluble metal(s) is suspended in a solution having a weight 3–10 times of that of the alloy and containing 0.5–4 wt % of an alkali hydroxide, where the amount of alkali hydroxide in the solution used is 5–30% of the weight of the alloy, or the alloy powder is suspended in water and a solution containing amount of alkali hydroxide is dropped to it, the suspension is heated at 90–100° C. until the intensive hydrogen development stops, then a solution containing 10–40 wt % alkali hydroxide is added to the suspension in such amount that the content of the alkali hydroxide relative to the weight of the starting alloy is 10–60 wt %, the suspension is stirred at 30–100° C. for further 3–60 minutes, and the solid phase is separated and washed to neutral.

8 Claims, No Drawings

PROCESS FOR THE PREPARATION OF SUPPORTED, NON-PYROPHORIC, SKELETON CATALYSTS OF POLAR SURFACE

The subject of the invention is the preparation of supported, non-pyrophoric, skeleton catalysts containing catalytically active metal(s), preferably nickel, cobalt, chromium, copper, manganese, iron, palladium and/or platinum.

The skeleton-metal (or Raney-metal) catalysts are made of alloys that contain catalytically active metal or metals (e.g.: Ni, Co, Fe, Cu, Pd, etc.) and easily dissolvable, catalytically inactive component or components (e.g.: Al, Si, Mg, Zn). In the alloy the active metal is "dissolved", i.e. it is finely dispersed. The inactive component is removed from the alloy using a solvent (generally aqueous alkali solution) not attacking the active metal. The active metal is left over as a catalyst in the form of fine particles. The activity of the catalysts made this way is greater than the one produced from the appropriate metal oxide with reduction. Their importance and wide-spread application are explained by the exceptionally high activity.

Skeleton catalysts were first patented by Raney (Raney, M.: U.S. Pat. Nos.: 1,563,787 (1925); 1,628,191 (1927); 1,915,473 (1933)).

From the alloy normally containing about 50% active metal and about 50% inactive component, the latter component is generally dissolved in two steps (Schröter, R.: Neuere Methoden der präparativen organischen Chemie, Verlag Chemie GmbH, Berlin, 1943, p. 78; Beregi, L.: Magyar Kémikusok Lapja 9, 234 (1954) Csűrös, Z., Petró, J. and Vörös, J.: MTA Km. Tud. Oszt. Közl. 9, 433 (1957)): The steps are the following:

(1) initial alkaline wash, and
(2) final alkaline wash.

The initial alkaline wash is generally carried out by adding the alloy to a 15–25 wt % alkali solution which amounts to four times the weight of the alloy (it is normally added slowly because of the intensive hydrogen development and the exothermic reaction). Then the mixture is heated until the hydrogen development is finished. The alloy to alkali solution—and the alloy to alkali hydroxide ratios, which are characteristic on this step, are given in weight-parts of the alloy, on the basis of the data of related references (Katalysatoren nach Raney, Merkblatt, Degussa (1967) p. 7):

| NaOH solution wt % | Solution/alloy wt. ratio | Alloy/NaOH wt. ratio |
|---|---|---|
| 13 | 12 | 2 |
| 20 | 4–5 | 0.8–1.0 |
| 25 | 4 | 1.0 |

When the initial alkaline wash is finished, the solution is separated by decantation and generally the suspension left is heated again with a fresh alkali solution using the same amount as for the initial alkaline wash, in order to complete the dissolution process.

The above process steps are in accordance with the present general practice. In modem industrial and commercial reviews generally above process descriptions can be found (Die Wirksamkeit spezieller Raney-Nickel-Katalysatoren mit definierte Eigenschaften für chemische Reaktionen. Informationen, DODUCO (1967).2.0).

The catalytic features of the catalyst made from a given alloy are decisively influenced by the conditions of the alkaline wash or washes described above. For example when dissolving a nickel-aluminium alloy the crystal system of the alloy containing the aluminium is rearranged. The way and extent of rearrangement changes with the time and temperature of the operation and with the amount of alkali (Wagner, H., Schwab, G. and Stolger, I.: Z. phys. Chem. B. 27, 439 (1934)). As a consequence the method of dissolving the alloy is decisive on the catalytic features of the product.

According to the U.S. Pat. No. 3,809,658, the starting alloy powder is decomposed first, in a wet solid phase using water and a small amount of alkali hydroxide, and then the process is finished with a following intensive dissolving treatment using concentrated alkali hydroxide solution at a temperature around 100° C.

As it is obvious from the related literature dozens of process variations have been tried in this field. All of them, with no-exception, are characterised by a first step wherein 20–30 wt % aqueous alkaline was used in an amount which was at least three-four times, but often 8–12 times the weight of the alloy. The objective of the invention is to provide a process for the preparation of a supported, non-pyrophoric skeleton catalyst, which process is fast, environmentally friendly, economical and characterised by simple technical feasibility.

It was found that the objective can be achieved, if the skeleton catalysts containing nickel, cobalt, chromium, copper, manganese, iron, palladium and/or platinum are produced from an alloy of catalytically active metal(s) and alkali-soluble metal(s), powdered to granules smaller than 200 $\mu$, by treating the alloy with an alkali hydroxide so that the powder is suspended in a solution having a weight 3–4 times of that of the alloy and containing 0.5–4 wt % of an alkali hydroxide, where the amount of alkali hydroxide in the solution used is 5–30% of the weight of the alloy, and the solution optionally contains ammonium chloride, or sodium chloride, or potassium chloride, and/or lithium chloride in an amount of 0.5–5% of the weight of the alloy, and the suspension is heated at 90–100° C. until the intensive hydrogen development stops. Alternatively the alloy powder is partly suspended in water and said amount of alkali hydroxide is added to the stirred suspension. Then a solution containing 10–40 wt % alkali hydroxide is added to the suspension in such amount that the content of the alkali hydroxide relative to the weight of the starting alloy is 10–60 wt %, the suspension is stirred at 30–100° C. for further 3–60 minutes, and then the solid phase containing the active metal(s) and the oxide-hydroxide formed from the alkali-soluble metal(s) is separated and washed to be neutral.

The process according to the invention is based on the recognition that if the disintegration of the alloy is done with a diluted, aqueous alkaline wash in which the amount of alkali is not enough to dissolve the alkali-soluble metal completely, then a significant part of this metal forms with water oxide/hydroxide not dissolving in the solution, therefore, as a support it stabilizes the active metal and increases its dispersion. The active metal content of the skeleton catalysts prepared according to the present invention is generally between 20 and 50 wt % (in contrast with the 93–98% metal content of the known catalysts). The skeleton catalysts prepared according to the invention show the following significant differences in comparison with the conventional preparations: they are non-pyrophoric, those that contain nickel are not magnetic, their relative density is significantly smaller (around 1 g/cm$^3$), their specific catalytic activity is higher and because of their aluminium oxide/hydroxide content, their surface is polar. All these characteristic features can be partly explained by the structural differences. For example the X-ray examination of the nickel skeleton catalyst made according to the invention showed that, unlike the conventional catalysts, in which the metal crystallites are generally bulky (about 200-nm size) and uniform, crystallites are present in two sizes, one of them is about one order of magnitude smaller than that in the conventional catalysts, about 20 nm, and the other one is X-ray amorphous, having a crystallite size of about 2–3 nm. This explains that the catalyst is not ferromagnetic like the known preparations. The X-ray examinations also showed that in the process of the catalyst preparation gypsite (Hidrargillit, $Al_2O_3 \cdot 3H_2O$) is developed from a part of the aluminium component and this acts as catalyst support. The BET surface measurements and the computer analysis of the adsorption data showed that most of the surface is present within meso-pores which are "ink-bottle" shaped, whereas the pores of the conventionally made catalysts are characterised by voids between the flat surfaces of the metal crystallites. The presence of the aluminium oxide/hydroxide as a carrier, and that the well dispersed nickel particles are embedded cause that the catalysts made according to the present invention are non-pyrophoric and their relative density is smaller than that of the known ones, furthermore, when dried, their specific surface area is about 40 times as much as the surface area of the conventional catalysts (about 40 $m^2/g$, while for the conventional catalysts about 1 $m^2/g$).

According to the invention it is advantageous to add all the granular powder of the starting alloy at the same time to the diluted alkali solution, in which the amount of the alkali hydroxide is only 5–30 wt % of the weight of the alloy, which ensures the disintegration of most of the alloy, but the alkali amount is not enough to bring all the aluminium into the solution as aluminate. The amount of the used alkali hydroxide depends on the granule size of the powdered alloy; the larger the particles are (e.g. around 100–200 $\mu$), the closer is to 30 wt %, and vica versa. It is also possible to proceed so that the alloy powder is suspended in water and the alkali is added dropwise into the solution while stirring. If a small amount of ammonium chloride, or sodium chloride, potassium-chloride or lithium-chloride is dissolved in the diluted alkali, it makes the disintegration of the alloy more controllable and simpler, it reduces the intensity of foaming caused by the hydrogen development and it also increases the catalytic activity. Close to the end of the disintegration process of the alloy another solution is added containing 10–60 wt % alkali hydroxide relative to the weight of the alloy as a more concentrated, 10–40 wt % solution. Its role is to make the disintegration complete and to remove the small amount of aluminium hydroxide that might get precipitated on the surface of the formed metal crystallites. The amount of the used alkali hydroxide within the given limits depends on the granule size of the alloys as described above.

The starting alloy which can be used consists of elements that dissolve in alkali, preferably of aluminium, silicon, or aluminium-silicon, and of active metal present in an amount of 30–60 wt %, preferably 50 wt %. Preferably the granule size of the alloy powder is smaller than 200 $\mu$m. Preferably sodium hydroxide or potassium-hydroxide can be used as alkali hydroxide.

The reaction is started at room temperature than the temperature is increased. At a temperature of about 50° C. the phase of the alloy richest in aluminium is dissolved during intensive hydrogen evolution, and then at 90–100° C. the main mass is dissolved. The maximum foam volume is 1.5–2 times the volume of the solution. In the case of 50 g alloy the dissolution is generally completed in 20–30 minutes and the process time of catalyst preparation is generally between 40 and 90 minutes.

At the end of the process the simplest way of separating the catalyst and the reaction mixture is decanting. The solid residue is washed with water to be neutral, filled in a graduated cylinder and after it settles down, the end volume is measured. Then solid is filtered in a glass filter and the weight of the wet filter cake that contains 30–40 wt % water is also determined. This is useful, because the catalyst is used in this form for catalytic hydrogenation. From the composition of the wet filter cake the amount of the metal used for hydrogenation can be estimated. As the catalyst is non-pyrophoric, it can also be stored under organic solvents and favourably under alcohol. The metal content of the dry catalyst is about 20–30 wt %.

The pyrophoric feature was examined as follows:

On each of three pieces of filter paper 1 gram of filter-wet catalyst was piled. The first sample was water-wet, the second one was impregnated with ethanol and the third one with methanol. Samples were placed into drying owen at 60° C. and kept there until a powder-dry state was achieved. Non of the samples was pyrophoric, what is more, the filter paper also remained colourless, so it was not even roasted. The same results were obtained with catalysts filtered after a hydrogenation reaction in ethanol.

The advantage of the invention is that it provides a simple process for preparing non-pyrophoric skeleton catalysts. The elimination of the pyrophoric feature and, thereby the reduction of the danger of fire and explosion means that the most serious disadvantage of skeleton catalysts has been eliminated and by this their scope of application was extended. The support provides a high dispersion to the active metal not obtained before and as a result ensures higher activity. Another advantage is that the relative density of the catalysts according to the invention is about 1 (the relative density of the known preparations is about 1.8), so while stirring they distribute in the volume of the reaction mixture more evenly, additionally they can be filtered out perfectly. The catalysts prepared according to the invention are not magnetic unlike the catalysts made conventionally, therefore, they can be stirred up more easily. The surface of the catalysts is polar which is favourable in numerous catalytic reactions. As an average the amount of the alkali hydroxide used for the preparation in the present process is one-third or even less than the amount used in the known procedures, so the environmental pollution is less. Further advantage is that the process is fast and it does not require any special equipment.

The process of the invention is illustrated with the following examples:

EXAMPLE 1

The catalytic hydrogenation activity was measured in a stirred flask, in ethanol solution, under one bar pressure, at room temperature, at 800–1300 rpm. The reactants were nitrobenzene, eugenol, acetophenone and benzyl cyanide. The pyrophoric feature of the catalyst was examined before and after the reaction.

70 $cm^3$ of water was put into a 150 $cm^3$ beaker and 10 g of alloy powder (50 wt % Al, 50 wt % Ni, particle size under 60 microns) was added to it. The suspension was stirred and heated to 75° C. To the suspension 20 $cm^3$ of 15% alkali solution was dropped while the temperature was 95° C. When the intensity of the foaming decreased significantly 25 $cm^3$ of 25% sodium hydroxide was added to it in one portion and the reaction mixture was stirred until it cooled down to room temperature. The catalyst was decanted and washed to be neutral. The volume of the catalyst was 21 cm³ and the weight of the wet filter cake was 20 g. A sample of about 1 g from the wet catalyst was placed on a filter paper and impregnated with methanol and then the preparation was placed into a drying owen and dried at 60° C. In 30 minutes it disintegrated into grey, dry powder and there was no colour left on the filter paper proving that the catalyst is not pyrophoric. The same test was carried out with the catalyst filtered out from the reaction mixture. This sample was not pyrophoric either.

EXAMPLE 2

70 cm³ of 1% sodium hydroxide and 0.1 g of ammonium chloride were put into a 150 cm³ beaker. The suspension was stirred and heated at 99–100° C. To the suspension 10 g of alloy powder (50 wt % Ni and 50 wt % Al, particle size under 100 microns) was added. The foaming decreased significantly after 30 minutes, then 6 cm³ 40% of sodium hydroxide was added to it. The reaction mixture was kept at 95–99° C. for further 50 minutes and then the reaction mixture was decanted and the catalyst was washed to be neutral. The volume of the catalyst was 40 cm³ and the weight of the wet filter cake was 33 g. The pyrophoric feature was tested as described in the first example. The catalyst was not pyrophoric and magnetic. The catalytic activity was measured in the hydrogenation of benzyl cyanide. The catalyst was active and was not pyrophoric after the reaction either.

EXAMPLE 3

50 cm³ of 1.5% sodium hydroxide was put into a 150 m³ beaker and was stirred at room temperature. 10 g of alloy powder (50 wt % Al, 50 wt % Ni, particle size under 60 microns) was added to it. The suspension was stirred for 20 minutes, then it was slowly heated above 92–95° C. and kept at this temperature for further 30 minutes. Then 10 cm³ of 15% sodium hydroxide was added to it. The heating was ceased and the reaction mixture was allowed to cool down to 60° C. The reaction mixture was decanted and the catalyst washed to be neutral. The volume of the catalyst was 22 cm³ and the weight of the wet filter cake was 20 g. The pyrophoric feature was tested as described in the first example. The catalyst was not pyrophoric and magnetic. The catalytic activity was measured in the hydrogenation of benzyl cyanide. The catalyst was not pyrophoric after the reaction either.

EXAMPLE 4

250 cm³ of water, 3.75 g of sodium hydroxide and 0.75 g of ammonium chloride were put into a 800 cm³ beaker and the solution was heated while stirring. To the solution at 60° C. temperature 50 g of alloy powder (47 wt % Al, 53 wt % Ni, particle size under 60 microns) was added. The suspension was heated at 99–100° C. until the foaming decreased (about 20 minutes). Then a solution of 50 cm³ water and 6 g sodium hydroxide having a temperature of 55° C. was added to it. The heating was ceased and the suspension was stirred until it cooled down to 50° C. The catalyst was decanted and washed to be neutral. The volume of the catalyst was 106 cm³ and the weight of the wet filter cake was 111 g. The pyrophoric feature was tested as described in the first example. The catalyst was not pyrophoric and magnetic. The catalytic activity was measured in the hydrogenation of nitrobenzene and acetophenone. The catalyst was active and not pyrophoric after the reaction either.

EXAMPLE 5

50 cm³ of a solution of 1.5% sodium hydroxide and 0.04 g of lithium chloride was put into a 150 cm³ beaker. The solution was stirred at room temperature and 10 g of alloy powder (50 wt % Al, 50 wt % Ni, particle size under 60 microns) was added to it. The temperature increased fast up to 95° C. At this point 10 cm³ of 15% sodium hydroxide was added to it in two parts. The reaction mixture was stirred for further 20 minutes at 98–99° C., and then the catalyst was decanted and washed to be neutral. The volume of the catalyst was 26 cm³ and the weight of the wet filter cake was 26.5 g. The pyrophoric feature was tested as described in the first example. The catalyst was not pyrophoric and magnetic. The catalytic activity was measured in the hydrogenation of benzyl cyanide. The catalyst was not pyrophoric after the reaction either.

EXAMPLE 6

250 cm³ of 1.5% sodium hydroxide and 2.5 g of potassium chloride were put into a 800 cm³ beaker. The solution was stirred and 50 g of alloy powder (47 wt % Al, 53 wt % Ni, particle size under 60 microns) was added to it. The solution was heated at 96–97° C. until the intensive foaming decreased, then 50 cm³ of 10% sodium hydroxide was added to it. The reaction mixture was heated at 98–99° C. for further 10 minutes then the heating was ceased and the suspension was stirred until its temperature decreased to 50° C. Then the catalyst was decanted and washed to be neutral. The volume of the catalyst was 100 cm³ and the wet filter cake was 116 g. The pyrophoric feature was tested as described in the first example. The catalyst was not pyrophoric and magnetic. The catalytic activity was measured in the hydrogenation of nitrobenzene and acetophenon. The catalyst was not pyrophoric after the hydrogenation either.

EXAMPLE 7

150 cm³ of water, 2 g of sodium hydroxide and 0.38 g of sodium chloride were put into a 400 cm³ beaker. The solution was stirred and heated to 50° C. To the solution 25 g of alloy powder (50 wt % Al, 44.5 wt % Ni, 2.5 wt % Mo, 1.5 wt % Co, 1.5 wt % Cr, particle size under 60 microns) was added. The suspension was heated at 95–96° C. and when the foaming was decreased 35 cm³ aqueous solution of 4 g sodium hydroxide having a temperature of 90° C. was added to it. Then the reaction mixture was heated at 98–100° C. for further 50 minutes. The heating was ceased and the suspension was stirred until its temperature decreased to 65° C. The catalyst was decanted and washed to be neutral. The volume of the catalyst was 55 cm³ and the weight of the wet filter cake was 50 g. The pyrophoric feature was tested as described in the first example. The catalyst was not pyrophoric and magnetic. The catalytic activity was measured in the hydrogenation nitrobenzene and acetophenon. The catalyst was not pyrophoric after the hydrogenation either.

EXAMPLE 8

150 cm³ of water, 2 g of sodium hydroxide and 0.38 sodium chloride were put into a 400 cm³ beaker and the solution was stirred. To the solution at room temperature 25 g of alloy powder (50 wt % Al, 50 wt % Co, particle size under 60 microns) was added. The procedure was further carried out as described in example 7. The volume of the catalyst was 38 cm³ and the weight of the wet filter cake was 56 g. The catalyst was magnetic which indicates that in this way magnetic powder of very fine dispersion can be produced. The catalyst was not pyrophoric. The catalytic activity was measured in the hydrogenation of benzyl cyanide at 80° C. under 15 bar pressure. The catalyst was not pyrophoric after the hydrogenation either.

EXAMPLE 9

A solution was prepared from 60 cm$^3$ of water, 1 g of sodium hydroxide and 0.13 g of ammonium chloride and stirred at room temperature. To the solution 10 g of alloy powder (29 wt % Al, 70 wt % Si, 1 wt % Pt, particle size under 150 microns) was added. The suspension was heated to 90° C., then a solution of 15 cm$^3$ water and 2 g sodium hydroxide was added to it in a 10 minute period at 95° C. The reaction mixture was heated for further 30 minutes at 96–98° C. The catalyst was decanted and washed to be neutral. The catalyst was filtered out and dried at 60° C. 14.6 g catalyst was obtained. The volume of the catalyst powder was 32 cm$^3$. The pyrophoric feature was tested as described in the first example. The catalyst was not pyrophoric. The catalytic activity was measured in the hydrogenation of eugenol. The catalyst was not pyrophoric after the hydrogenation either.

EXAMPLE 10

In a 150 cm$^3$ beaker a solution was prepared from 60 cm$^3$ of water, 1 g of sodium hydroxide and 0.13 g of ammonium chloride and stirred at room temperature. To the solution 10 g of alloy powder (29 wt % Al, 68 wt % Si, 2 wt % Pd, 0.76 wt % Cu, particle size under 60 microns) was added. The temperature raised and reached 92° C. in 10 minutes, then 2 g of sodium hydroxide in 15 cm$^3$ water was added to the suspension in 7 minutes. The reaction mixture was heated for further 15 minutes at 92–95° C. The catalyst was decanted and washed to be neutral. The catalyst was filtered out and dried at 60° C. The weight of the catalyst was 12.3 g and the volume of the catalyst powder was 24 cm$^3$. The pyrophoric feature of the catalyst was tested as described in the first example. The catalyst was not pyrophoric. The catalytic activity of the catalyst was measured in the hydrogenation of eugenol. The catalyst was not pyrophoric after the hydrogenation either.

EXAMPLE 11

150 cm$^3$ of water, 1.88 g of sodium hydroxide and 0.375 g of ammonium chloride were put into a 600 cm$^3$ beaker. The solution was heated to 50° C. and 25 g of alloy powder (50 wt % Al, 40 wt % Ni, 3 wt % Cr, 7 wt % Fe, particle size under 100 microns) was added to it. The suspension was heated at 99–100° C. until the foaming was ceased (about 25 minutes), then the heating was stopped and 25 cm$^3$ aqueous solution of 3 g sodium hydroxide having a temperature of 70° C. was added to it. The suspension was stirred until its temperature decreased to 50° C. The catalyst was decanted and washed to be neutral. The volume of the catalyst was 53 cm$^3$ and the weight of the wet filter cake was 53 g. The pyrophoric feature was tested as described in the first example. The catalyst was not pyrophoric and magnetic. The catalytic activity was measured in the hydrogenation of nitrobenzene and acetophenone. The catalyst was active in both reactions. The catalyst was not pyrophoric after the reactions either.

What is claimed is:

1. A process for the preparation of a supported, non-pyrophoric, skeleton catalyst having a polar surface and comprising catalytically active metal(s) in high dispersion by treating an alloy powder of the catalytically active metal(s) and alkali-soluble metal(s) with an aqueous alkali metal hydroxide solution, characterized in that
    i) first suspending the alloy in a solution having a weight 3–10 times of that of the alloy and containing 0.5–4 weight % of an alkali metal hydroxide, where the amount of alkali metal hydroxide in the solution used is 5 to 30% of the weight of the alloy, or in water and drop-wise adding a solution containing said amount of alkali hydroxide,
    ii) subsequently heating the suspension at 90–1000° C. until the intensive hydrogen development stops,
    iii) subsequently adding to the suspension a solution containing 10–40% alkali hydroxide in such amount that the content of the alkali hydroxide relative to the weight of the starting alloy is 10–60 wt %,
    iv) subsequently stirring the suspension at 30–100° C. for further 3–60 minutes, and
    v) finally separating and washing to neutral the solid phase containing the active metal(s) and the oxide-hydroxide formed from the alkali-soluble metal(s).

2. The process of claim 1, wherein the starting alkali hydroxide solution comprises 0.5–5 wt %, relative to the weight of the alloy, of ammonium chloride, or sodium chloride, or potassium chloride and/or lithium chloride.

3. The process of claim 2, wherein the catalytically active metal is selected from the group consisting of nickel, cobalt, chromium, copper, manganese, iron, palladium, platinum and mixtures of two or more thereof.

4. The process of claim 2, wherein the alkali-soluble metal is aluminum, silicon or a mixture thereof.

5. The process of claim 2, further comprising that the catalyst is stored under a lower alcohol.

6. The process of claim 1, further comprising that the catalyst is stored under an organic solvent.

7. The process of claim 1, wherein the one or more catalytically active metal(s) is or are selected from the group consisting of nickel, cobalt, chromium, copper, manganese, iron, palladium, platinum and mixtures of two or more thereof.

8. The process of claim 1, wherein the alkali-soluble metal is aluminum, silicon or a mixture thereof.

* * * * *